(12) United States Patent
Souri et al.

(10) Patent No.: US 10,417,123 B1
(45) Date of Patent: Sep. 17, 2019

(54) SYSTEMS AND METHODS FOR IMPROVING GARBAGE COLLECTION AND WEAR LEVELING PERFORMANCE IN DATA STORAGE SYSTEMS

(71) Applicant: Western Digital Technologies, Inc., Irvine, CA (US)

(72) Inventors: Kamyar Souri, Irvine, CA (US); Andrew J. Tomlin, San Jose, CA (US); Dmitry S. Obukhov, San Jose, CA (US); Jing Booth, San Jose, CA (US); Mei-Man L. Syu, Fremont, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 357 days.

(21) Appl. No.: 14/028,412

(22) Filed: Sep. 16, 2013

Related U.S. Application Data

(60) Provisional application No. 61/824,137, filed on May 16, 2013, provisional application No. 61/824,001, filed on May 16, 2013.

(51) Int. Cl.
*G06F 12/00* (2006.01)
*G06F 12/02* (2006.01)

(52) U.S. Cl.
CPC ...... *G06F 12/0253* (2013.01); *G06F 12/0246* (2013.01)

(58) Field of Classification Search
CPC .................. G06F 12/0246; G06F 12/0253
See application file for complete search history.

(56) References Cited

U.S. PATENT DOCUMENTS

| | | | |
|---|---|---|---|
| 6,016,275 A | 1/2000 | Han | |
| 6,230,233 B1 | 5/2001 | Lofgren et al. | |
| 6,594,183 B1 | 7/2003 | Lofgren et al. | |
| 6,850,443 B2 | 2/2005 | Lofgren et al. | |
| 6,856,556 B1 | 2/2005 | Hajeck | |
| 7,126,857 B2 | 10/2006 | Hajeck | |
| 7,353,325 B2 | 4/2008 | Lofgren et al. | |
| 7,430,136 B2 | 9/2008 | Merry, Jr. et al. | |
| 7,447,807 B1 | 11/2008 | Merry et al. | |
| 7,502,256 B2 | 3/2009 | Merry, Jr. et al. | |
| 7,509,441 B1 | 3/2009 | Merry et al. | |
| 7,596,643 B2 | 9/2009 | Merry, Jr. et al. | |
| 7,653,778 B2 | 1/2010 | Merry, Jr. et al. | |
| 7,685,337 B2 | 3/2010 | Merry, Jr. et al. | |
| 7,685,338 B2 | 3/2010 | Merry, Jr. et al. | |
| 7,685,374 B2 | 3/2010 | Diggs et al. | |
| 7,733,712 B1 | 6/2010 | Walston et al. | |
| 7,765,373 B1 | 7/2010 | Merry et al. | |

(Continued)

*Primary Examiner* — David Yi
*Assistant Examiner* — Alan Otto
(74) *Attorney, Agent, or Firm* — Morgan, Lewis & Bockius LLP

(57) ABSTRACT

Disclosed embodiments are directed to systems and methods for improving garbage collection and wear leveling performance in data storage systems. The embodiments can improve the efficiency of static wear leveling by picking the best candidate block for static wear leveling and/or postponing static wear leveling on certain candidate blocks. In one embodiment, one or more source blocks for a static wear leveling operation are selected based at least on whether the one or more blocks have a low P/E count and contain static data, such as data that has been garbage collected.

22 Claims, 5 Drawing Sheets

(56) References Cited

U.S. PATENT DOCUMENTS

| | | |
|---|---|---|
| 7,898,855 B2 | 3/2011 | Merry, Jr. et al. |
| 7,912,991 B1 | 3/2011 | Merry et al. |
| 7,936,603 B2 | 5/2011 | Merry, Jr. et al. |
| 7,962,792 B2 | 6/2011 | Diggs et al. |
| 8,078,918 B2 | 12/2011 | Diggs et al. |
| 8,090,899 B1 | 1/2012 | Syu |
| 8,095,851 B2 | 1/2012 | Diggs et al. |
| 8,108,692 B1 | 1/2012 | Merry et al. |
| 8,122,185 B2 | 2/2012 | Merry, Jr. et al. |
| 8,127,048 B1 | 2/2012 | Merry et al. |
| 8,135,903 B1 | 3/2012 | Kan |
| 8,151,020 B2 | 4/2012 | Merry, Jr. et al. |
| 8,161,227 B1 | 4/2012 | Diggs et al. |
| 8,166,245 B2 | 4/2012 | Diggs et al. |
| 8,243,525 B1 | 8/2012 | Kan |
| 8,254,172 B1 | 8/2012 | Kan |
| 8,261,012 B2 | 9/2012 | Kan |
| 8,296,625 B2 | 10/2012 | Diggs et al. |
| 8,312,207 B2 | 11/2012 | Merry, Jr. et al. |
| 8,316,176 B1 | 11/2012 | Phan et al. |
| 8,341,339 B1 | 12/2012 | Boyle et al. |
| 8,375,151 B1 | 2/2013 | Kan |
| 8,380,946 B2 | 2/2013 | Hetzler et al. |
| 8,386,700 B2 | 2/2013 | Olbrich et al. |
| 8,392,635 B2 | 3/2013 | Booth et al. |
| 8,397,107 B1 | 3/2013 | Syu et al. |
| 8,407,449 B1 | 3/2013 | Colon et al. |
| 8,423,722 B1 | 4/2013 | Deforest et al. |
| 8,433,858 B1 | 4/2013 | Diggs et al. |
| 8,443,167 B1 | 5/2013 | Fallone et al. |
| 8,447,920 B1 | 5/2013 | Syu |
| 8,458,435 B1 | 6/2013 | Rainey, III et al. |
| 8,478,930 B1 | 7/2013 | Syu |
| 8,489,854 B1 | 7/2013 | Colon et al. |
| 8,503,237 B1 | 8/2013 | Horn |
| 8,521,972 B1 | 8/2013 | Boyle et al. |
| 8,549,236 B2 | 10/2013 | Diggs et al. |
| 8,583,835 B1 | 11/2013 | Kan |
| 8,601,311 B2 | 12/2013 | Horn |
| 8,601,313 B1 | 12/2013 | Horn |
| 8,612,669 B1 | 12/2013 | Syu et al. |
| 8,612,804 B1 | 12/2013 | Kang et al. |
| 8,615,681 B2 | 12/2013 | Horn |
| 8,638,602 B1 | 1/2014 | Horn |
| 8,639,872 B1 | 1/2014 | Boyle et al. |
| 8,683,113 B2 | 3/2014 | Abasto et al. |
| 8,700,834 B2 | 4/2014 | Horn et al. |
| 8,700,950 B1 | 4/2014 | Syu |
| 8,700,951 B1 | 4/2014 | Call et al. |
| 8,706,985 B1 | 4/2014 | Boyle et al. |
| 8,707,104 B1 | 4/2014 | Jean |
| 8,713,066 B1 | 4/2014 | Lo et al. |
| 8,713,357 B1 | 4/2014 | Jean et al. |
| 8,719,531 B2 | 5/2014 | Strange et al. |
| 8,724,422 B1 | 5/2014 | Agness et al. |
| 8,725,931 B1 | 5/2014 | Kang |
| 8,745,277 B2 | 6/2014 | Kan |
| 8,751,728 B1 | 6/2014 | Syu et al. |
| 8,769,190 B1 | 7/2014 | Syu et al. |
| 8,769,232 B2 | 7/2014 | Suryabudi et al. |
| 8,775,720 B1 | 7/2014 | Meyer et al. |
| 8,782,327 B1 | 7/2014 | Kang et al. |
| 8,788,778 B1 | 7/2014 | Boyle |
| 8,788,779 B1 | 7/2014 | Horn |
| 8,788,880 B1 | 7/2014 | Gosla et al. |
| 8,793,429 B1 | 7/2014 | Call et al. |
| 9,652,376 B2 * | 5/2017 | Kuzmin ............... G06F 12/0246 |
| 2007/0030734 A1 * | 2/2007 | Sinclair et al. .......... 365/185.11 |
| 2008/0147998 A1 * | 6/2008 | Jeong .............................. 711/161 |
| 2008/0239811 A1 | 10/2008 | Tanaka |
| 2009/0077429 A1 | 3/2009 | Yim et al. |
| 2009/0089485 A1 | 4/2009 | Yeh |
| 2009/0091978 A1 | 4/2009 | Yeh |
| 2009/0113112 A1 | 4/2009 | Ye et al. |
| 2009/0157952 A1 | 6/2009 | Kim et al. |
| 2009/0172258 A1 | 7/2009 | Olbrich et al. |
| 2009/0182936 A1 | 7/2009 | Lee |
| 2009/0216936 A1 | 8/2009 | Chu et al. |
| 2009/0240873 A1 | 9/2009 | Yu et al. |
| 2010/0174849 A1 | 7/2010 | Walston et al. |
| 2010/0250793 A1 | 9/2010 | Syu |
| 2010/0287328 A1 | 11/2010 | Feldman et al. |
| 2011/0099323 A1 | 4/2011 | Syu |
| 2011/0191521 A1 * | 8/2011 | Araki et al. .................. 711/103 |
| 2011/0225346 A1 | 9/2011 | Goss et al. |
| 2011/0283049 A1 | 11/2011 | Kang et al. |
| 2012/0023144 A1 | 1/2012 | Rub |
| 2012/0066438 A1 | 3/2012 | Yoon et al. |
| 2012/0072654 A1 | 3/2012 | Olbrich et al. |
| 2012/0260020 A1 | 10/2012 | Suryabudi et al. |
| 2012/0278531 A1 | 11/2012 | Horn |
| 2012/0284460 A1 | 11/2012 | Guda |
| 2012/0324191 A1 | 12/2012 | Strange et al. |
| 2013/0073788 A1 | 3/2013 | Post et al. |
| 2013/0132638 A1 | 5/2013 | Horn et al. |
| 2013/0145106 A1 | 6/2013 | Kan |
| 2013/0159648 A1 * | 6/2013 | Anglin ................ G06F 11/1453 711/162 |
| 2013/0173844 A1 * | 7/2013 | Chen ................... G06F 12/0246 711/103 |
| 2013/0290793 A1 | 10/2013 | Booth et al. |
| 2013/0311705 A1 * | 11/2013 | Cheng ................ G06F 12/0246 711/103 |
| 2014/0059405 A1 | 2/2014 | Syu et al. |
| 2014/0101369 A1 | 4/2014 | Tomlin et al. |
| 2014/0115427 A1 | 4/2014 | Lu |
| 2014/0133220 A1 | 5/2014 | Danilak et al. |
| 2014/0136753 A1 | 5/2014 | Tomlin et al. |
| 2014/0149826 A1 | 5/2014 | Lu et al. |
| 2014/0157078 A1 | 6/2014 | Danilak et al. |
| 2014/0181432 A1 | 6/2014 | Horn |
| 2014/0223255 A1 | 8/2014 | Lu et al. |

* cited by examiner

SYSTEMS AND METHODS FOR IMPROVING GARBAGE COLLECTION AND WEAR LEVELING PERFORMANCE IN DATA STORAGE SYSTEMS

CROSS REFERENCE TO RELATED APPLICATIONS

This application claims benefit under 35 U.S.C. § 119(e) to U.S. Provisional Patent Application No. 61/824,137 entitled "BLOCK SELECTION FOR GARBAGE COLLECTION OPERATIONS IN A SOLID-STATE DATA STORAGE DEVICE" filed on May 16, 2013, and U.S. Provisional Patent Application No. 61/824,001 entitled "STATIC WEAR LEVELING IN A SOLID-STATE DATA STORAGE DEVICE" filed on May 16, 2013; the disclosures of which are hereby incorporated by reference in their entirety.

BACKGROUND

Technical Field

This disclosure relates to data storage systems. In particular, this disclosure relates to systems and methods for improving garbage collection and wear leveling performance in data storage systems.

Description of Related Art

Data storage systems execute many operations in the course of their normal operation. For example, data storage systems execute read and write commands requested by a host system or internal operations, such as garbage collection and wear leveling. Some internal operations may require a large number of resources for execution. Accordingly, there is a need to improve execution of internal operations.

BRIEF DESCRIPTION OF THE DRAWINGS

Systems and methods which embody the various features of the invention will now be described with reference to the following drawings, in which.

DETAILED DESCRIPTION

Figure 1:
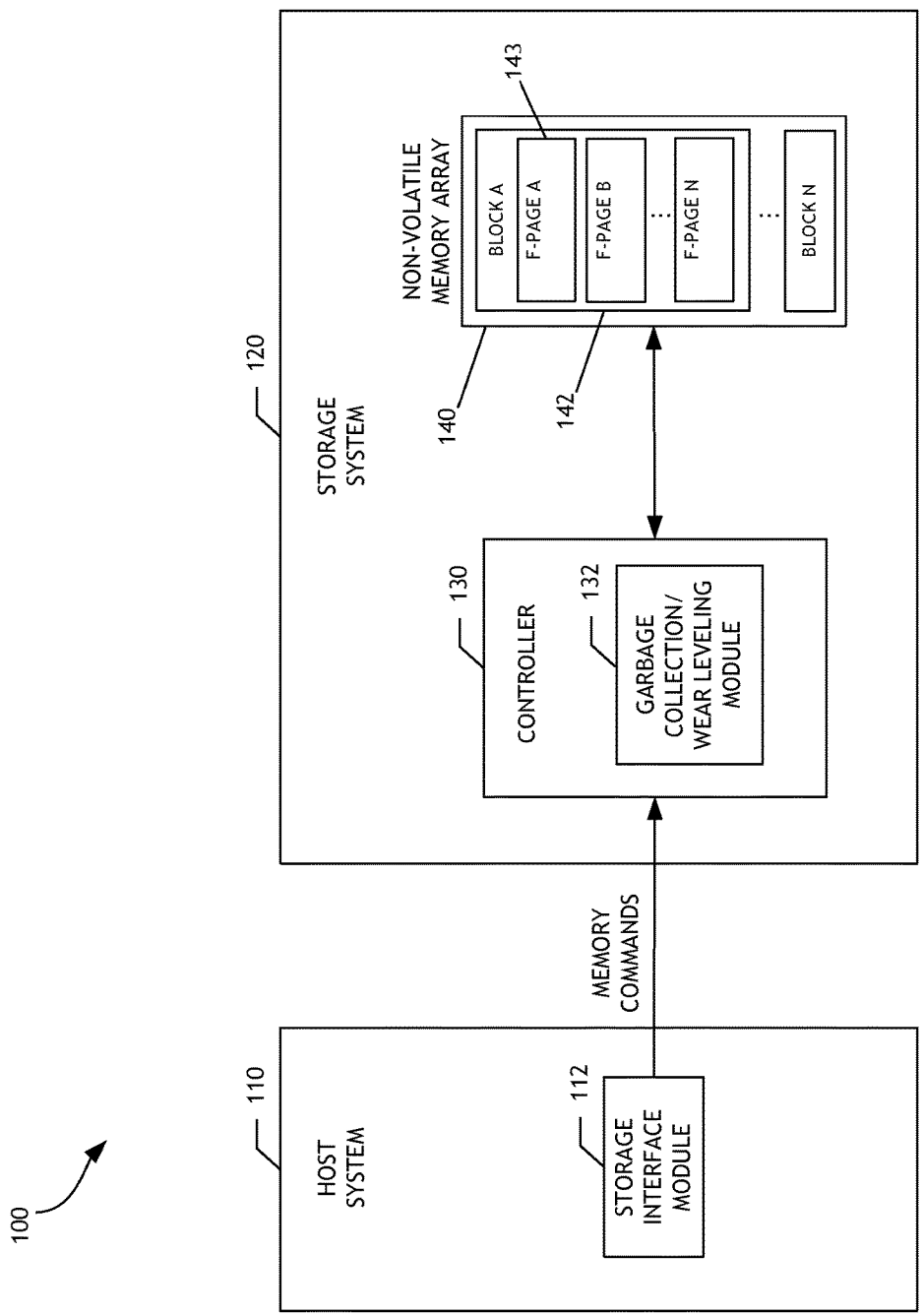
FIG. 1 illustrates a combination of a host system and a data storage system that implements garbage collection and/or static wear leveling according to one embodiment of the invention.

While certain embodiments are described, these embodiments are presented by way of example only, and are not intended to limit the scope of the disclosure. Indeed, the novel methods and systems described herein may be embodied in a variety of other forms. Furthermore, various omissions, substitutions and changes in the form of the methods and systems described herein may be made without departing from the spirit of the disclosure.

Overview

Data storage systems can execute host commands and internal operations in the course of their normal operation. For example, garbage collection may be performed on memory blocks that contain both valid and invalid data. When a memory block is selected for garbage collection, the garbage collection operation copies valid data within the memory block to a new location in memory and then erases the entire memory block, making the entire block available for future data writes. Therefore, the amount of memory freed by the garbage collection process depends on the amount of invalid pages within the memory blocks selected for garbage collection.

In addition, static wear leveling, which can be considered a sub-part or special case of garbage collection, can be used in solid-state storage systems to prolong their lifecycle. A wear leveling operation may involve moving data content in a first block of memory to a second block of memory that has reached a certain erase level or count because of a recent erase operation. The first block of memory, which has a lower P/E level or count than that of the second memory unit, is then erased and made available for a future write operation. This has the effect of directing future wear toward the less worn first memory unit, and thus the overall process of wear leveling ensures that erase operations are evenly spread across blocks of memory in a solid-state storage system. Since each erase operation increases the wear of a block by incrementally reducing the block's ability to properly retain data content, static wear leveling helps prevent certain blocks of memory from receiving an excessive amount of erase operations relative to other blocks and thus experiencing data failures much earlier than other blocks.

Static wear leveling however can be an expensive internal memory activity which frees a block with a low program/erase (P/E) count, but does not free new space. The goal for some static wear leveling algorithms is to keep the P/E count of all the blocks in a solid-state memory within a window, sometimes referred to as a P/E window. For example, the P/E count of a least worn block should be kept within a certain number of the P/E count of the most worn block. This is usually done by picking the one or more blocks with the minimum P/E count to go through static wear leveling.

The efficiency of static wear leveling can be measured in one or more ways. One efficiency metric can be a P/E count difference between a selected block and a destination block to which data is being relocated. A higher P/E count difference may indicate a better efficiency since this can mean that likely infrequently overwritten data stored in a selected block is relocated to a destination block with a relatively higher P/E count. Another efficiency metric can be the data age of data stored in a selected block. In one embodiment, a block is selected for static wear leveling when there is an indication that data stored to the block is infrequently overwritten by a host system, meaning that the selected block stores data with a relatively higher data age. A relatively higher data age thus can provide a useful indication that if the data stored in the selected block is relocated to a destination block having a relatively higher P/E count, the relocated data is not likely to be overwritten by the host system in the near future.

Some embodiments of this disclosure are directed to systems and methods for improving garbage collection and wear leveling performance. Some embodiments improve the efficiency of static wear leveling by: (1) picking the best candidate block for static wear leveling, and/or (2) postponing static wear leveling on certain candidate blocks. For instance, a block that has a relatively higher P/E count, but is less likely to be overwritten by a host system in the short-term, can be selected as a candidate for static wear leveling operation rather than a block having a relatively lower P/E count but which is more likely to be overwritten in the short-term. In addition, by postponing static wear leveling on candidate blocks containing data that is likely be overwritten by a host system in the short-term, the need to invalidate and relocate data can be eliminated in some cases.

Some embodiments of this disclosure are further directed to measuring the data age of data and identifying static or dynamic data based on the data age. In this disclosure, data that is or may be frequently overwritten by a host system can be referred to as "dynamic" and/or "hot" data (e.g., data that has been recently written), and data that is or may be infrequently overwritten can be referred to as "static" and/or "cold" data (e.g., data that has been garbage collected). Whether data is dynamic or static can provide an indication of when the data may likely be overwritten by the host system, and accordingly which candidate block to select for a static wear leveling operation and whether the static wear leveling may be beneficially postponed on a candidate block.

System Overview

FIG. 1 illustrates a combination 100 of a host system 110 and a storage system 120 that implements garbage collection and/or static wear leveling according to one embodiment of the invention. As is shown, a storage system 120 (e.g., hybrid hard drive, solid state drive, etc.) includes a controller 130 and a non-volatile memory array 140, which comprises one or more blocks of storage, identified as Block "A" (142) through Block "N". Each block comprises a plurality of flash pages (F-pages). For example, Block A (142) of FIG. 1 includes a plurality of F-pages, identified as F-Pages A (143), B, through N. In some embodiments, each "block" is a smallest grouping of memory pages or locations of the non-volatile memory array 140 that are erasable in a single operation or as a unit, and each "F-page" or "page" is a smallest grouping of memory cells that can be programmed in a single operation or as a unit. Other embodiments may use blocks and pages that are defined differently.

The non-volatile memory array 140 may comprise an array of non-volatile memory, such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof. In some embodiments, the data storage system 120 can further comprise other types of storage, such as one or more magnetic media storage modules or other types of storage modules. Moreover, although embodiments of this disclosure may be described in the context of non-volatile memory arrays, the systems and methods of this disclosure can also be useful in other storage systems like hard drives, shingled disk drives, and hybrid disk drives that may have both solid-state storage and magnetic storage components. As such, while certain internal operations are referred to which are typically associated with solid-state storage systems (e.g., "wear leveling" and "garbage collection") analogous operations for other storage systems can also take advantage of this disclosure.

The controller 130 can be configured to receive data and/or storage access commands from a storage interface module 112 (e.g., a device driver) of the host system 110. Storage access commands communicated by the storage interface module 112 can include write data and read data commands issued by the host system 110. Read and write commands can specify a logical address (e.g., logical block addresses or LBAs) used to access the data storage system 120. The controller 130 can execute the received commands in the non-volatile memory array 140.

Data storage system 120 can store data communicated by the host system 110. In other words, the data storage system 120 can act as memory storage for the host system 110. To facilitate this function, the controller 130 can implement a logical interface. The logical interface can present to the host system 110 data storage system memory as a set of logical addresses (e.g., contiguous address) where user data can be stored. Internally, the controller 130 can map logical addresses to various physical locations or addresses in the non-volatile memory array 140 and/or other storage modules.

The controller 130 includes a garbage collection/wear leveling module 132 configured to perform garbage collection and wear leveling. As used herein, a static wear leveling operation can be considered a sub-part of, or a special case of, an overall garbage collection operation. In some embodiments, the garbage collection/static wear leveling module 132 performs solely static wear leveling while, in other embodiments, performs garbage collection and/or static wear leveling of at least a portion of the non-volatile memory array 140. In one embodiment, the garbage collection/wear leveling module 132 may prevent abnormal increases or spikes in write amplification while performing static wear leveling using the approaches described in this disclosure.

In one embodiment, the garbage collection/static wear leveling module 132 can select blocks of the non-volatile memory array 140 on which garbage collection and/or static wear leveling is performed. Such block picking functionality may be performed based at least in part on information related to data age and/or wear leveling. The blocks may be picked in a way that increases the amount of free space through the life of the data storage system 120 and promotes or guarantees that blocks stay within a range of P/E counts, which may maximize the data storage life of the non-volatile memory array 140.

Data Age

The garbage collection/static wear leveling module 132 and/or the controller 130 can determine or estimate the data age of data stored in the non-volatile memory array 140 based at least on when the controller 130 wrote the data to the non-volatile memory array 140 (e.g., according to instructions from the host system 110). In one embodiment, when the controller 130 receives a command to write data, the controller 130 can execute the write command in one or more blocks of the non-volatile memory array 140. Upon successful execution of the write command, the newly written data can be associated with or assigned a lowest data age value, such as a data age of 0. Subsequently, the data age of this data may increase over time until the controller 130 executes a command from the host system 110 to erase this data. Internal memory operations (e.g., garbage collection or static wear leveling) by the storage system 120 may not reset the data age associated with the data in some implementations.

In one embodiment, when the controller 130 writes a block with data from the host system 110, a timestamp is stored as a block attribute of the block or saved to an area of the memory reserved for system information. The timestamp can be stored relative to, for instance, a counter maintained by the controller 130, such as a counter that counts a power on time since manufacturing for the storage system 120. The counter can have a resolution of one or more seconds or a fraction of a second. Based on this counter, the data age of the data stored in blocks of the non-volatile memory array 140 can be determined using Equation 1:

$$\text{DataAge}_{Block} = \text{Time}_{Now} - \text{TimeStamp}_{Block} \quad \text{(Equation 1)}$$

where $\text{Time}_{Now}$ corresponds to a time when the data age of the data stored to a block is determined, $\text{TimeStamp}_{Block}$ corresponds to the time indicated by the timestamp for the block, and $\text{DataAge}_{Block}$ corresponds to the data age of the stored data.

Additionally, the data ages can be truncated, rounded, or normalized (e.g., to a value in a range of 0 to 1) in some implementations to facilitate easier processing or storage of the data ages. For example, the timestamp can be normalized relative to a maximum data age, according to Equation 2:

$$\text{RelativeAge}_{Block} = \frac{\text{DataAge}_{Block}}{\text{MaximumAge}} \quad \text{(Equation 2)}$$

where $\text{DataAge}_{Block}$ corresponds to an absolute data age of the data stored to a block, MaximumAge corresponds to a maximum data age normalizing value, and $\text{RelativeAge}_{Block}$ corresponds to the relative data age of the data of the block. The maximum data age, in one embodiment, can equal either (1) an oldest data age of the data stored in the non-volatile memory array 140 or (2) a value proportional to a storage size of the non-volatile memory array 140 (e.g., a value proportional to a write time for filling the non-volatile memory array 140 with data). The maximum data age further may be determined according to Equation 3:

$$\text{MaximumAge} = \text{Min}(N \times \text{DriveFillTime}, \text{DataAge}_{max}) \quad \text{(Equation 3)}$$

where DriveFillTime corresponds to a time to fill the non-volatile memory array 140 with data, N corresponds to a multiplier controllable to scale DriveFillTime, and $\text{DataAge}_{max}$ corresponds to a maximum absolute data age of data stored to the non-volatile memory array 140. In one embodiment, the value of N can be determined according to Equation 4:

$$N = \frac{\text{MaxDeltaPE}}{2} \quad \text{(Equation 4)}$$

where MaxDeltaPE corresponds to a size of a P/E window for the non-volatile memory array 140.

The garbage collection/wear leveling module 132 can issue a garbage collection command that involves multiple blocks of the non-volatile memory array 140 in a single operation. For instance, in one garbage collection operation, the garbage collection/wear leveling module 132 can issue a command for the controller 130 to write valid data stored in two or more blocks to a single free block. Since each of the two or more garbage collected blocks may have a different data age associated with the valid data stored in the block, the garbage collection/wear leveling module 132 may further determine an assigned data age for the valid data written to the single block. In one embodiment, a highest, median, average, or lowest data age associated with the garbage collected data can be assigned to the single block. In another embodiment, a weighted average of the data ages can be assigned using Equation 5:

$$\text{DataAge}_{ColdBlock} = \sum_{i=1}^{N} \frac{\text{ValidCount}_i \times \text{DataAge}_i}{N} \quad \text{(Equation 5)}$$

where $\text{ValidCount}_i$ corresponds to an amount of valid data in an $i^{th}$ block, $\text{DataAge}_i$ corresponds to the data age of the data stored in the $i^{th}$ block, N corresponds to the number of garbage collected blocks, and $\text{DataAge}_{ColdBlock}$ corresponds to the assigned data age for the single block.

The data age assigned to data can be used to classify the data age relative to data age ranges. That is, when the data age of data stored in a block falls within one of the multiple data age ranges, the data stored in the block can be classified as within or part of the data age range. For example, data can be classified as within a relatively low data age range, a medium data age range, and a relatively high data age range in one implementation. The multiple data age ranges can be separated by thresholds usable to determine whether the data age of particular data is within a certain data age range. In one embodiment, the multiple data age ranges include a static data age range and a dynamic data age range, and the static and dynamic data age ranges are separated by a static-dynamic data threshold. For instance, data having a relative data age meeting a static-dynamic data threshold (e.g., equal to a relative data age of 0.8, 0.9, or 1.0) can be classified as static data while data having a relative data age not meeting the static-dynamic data threshold can be classified as dynamic data.

Static Wear Leveling

Figure 2:
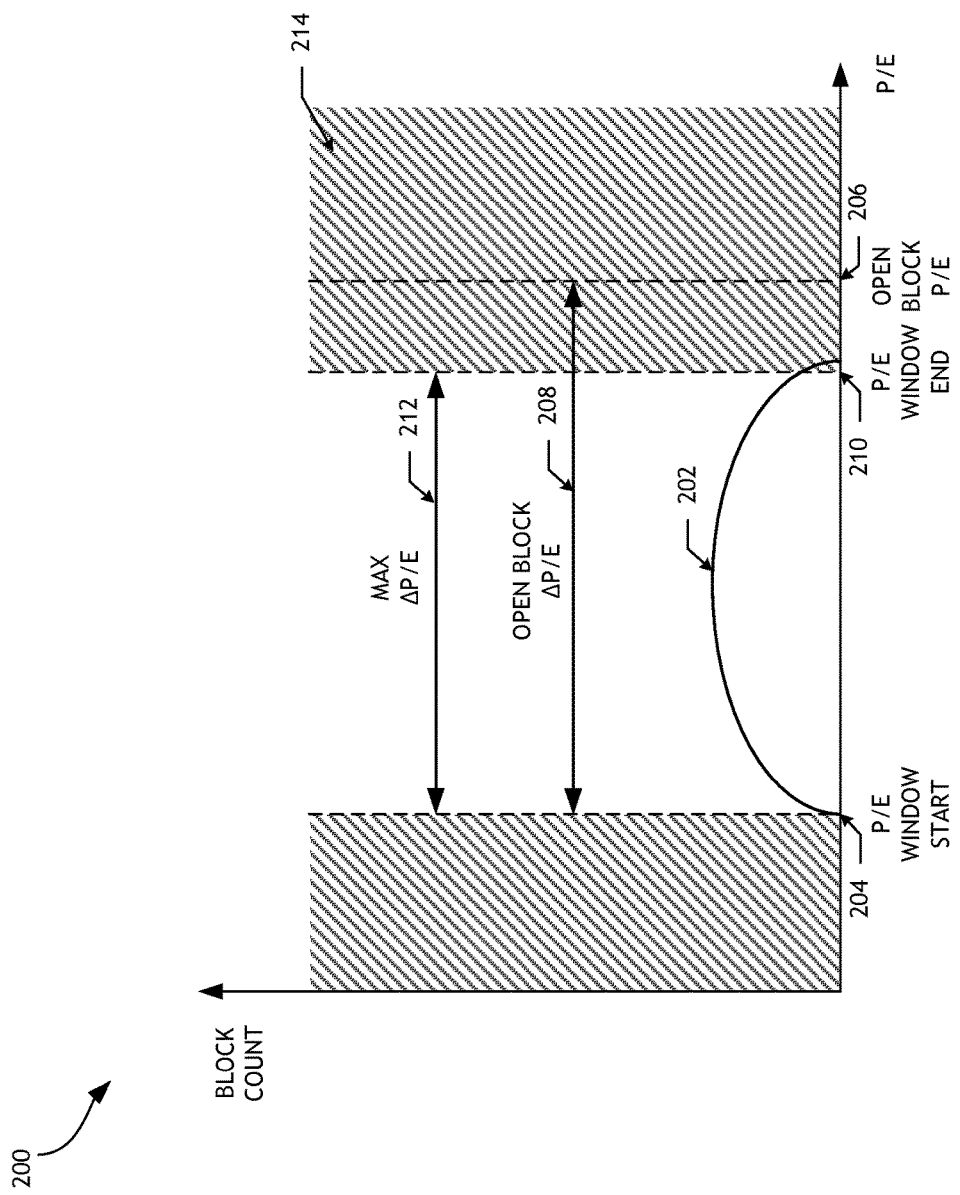
FIG. 2 is a graph that illustrates counts of blocks of a solid-state storage system relative to the P/E counts of the blocks according to one embodiment of the invention.

FIG. 2 is a graph 200 that illustrates counts of blocks of a non-volatile memory array relative to the P/E counts of the blocks according to one embodiment of the invention. The histogram line 202 on the graph 200 shows the P/E count distribution of non-volatile memory array blocks, beginning at a lowest P/E count defined as the P/E window start 204. The P/E count of the non-volatile memory array block having a highest P/E count is denoted by Open Block P/E 206. The P/E count difference between the Open Block P/E 206 and the P/E window start 204 can be defined as Open Block ΔP/E 208. A P/E window end 210 may be defined relative to the P/E window start 204 and equal the sum of the count at the P/E window start 204 and a P/E count difference or window size (i.e., Max ΔP/E 212) of a P/E window. In one embodiment, the P/E window size can be an ideal distance between the P/E count of the least worn block(s) and the most worn block(s) in the non-volatile memory array. When one or more blocks have P/E counts outside of the P/E window and in the shaded area 214, data storage systems like the data storage system 120 may consider or take one or more actions, such as corrective actions like performing a garbage collection or static wear leveling operation using the one or more blocks with P/E counts outside of the P/E window.

Figure 3:
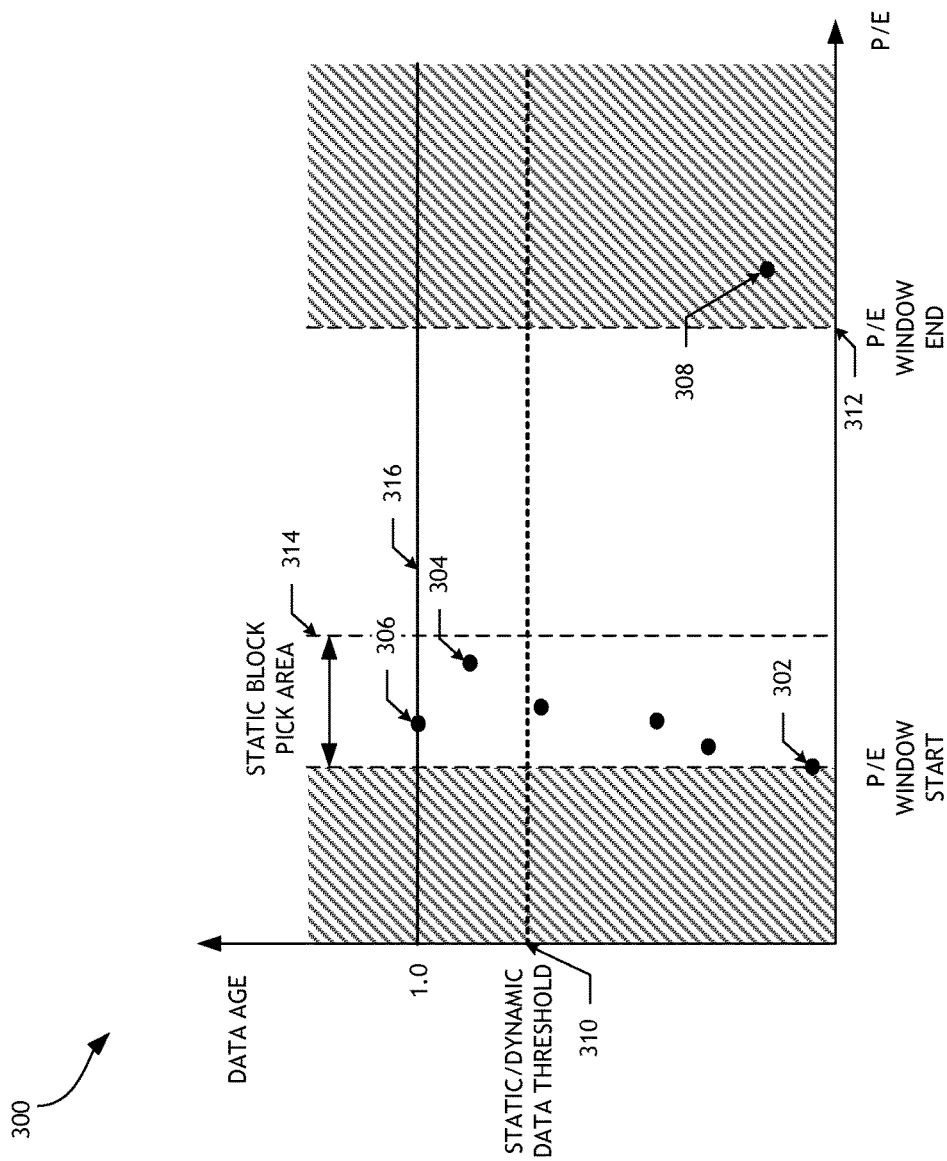
FIG. 3 is a graph that illustrates conditions for performing static wear leveling according to one embodiment of the invention.

FIG. 3 is a graph 300 that illustrates conditions for performing static wear leveling according to one embodiment of the invention. The graph 300 charts a distribution of blocks, such as blocks 302, 304, 306, and 308, relative to the data age of data stored in the blocks (shown on a relative data age scale from 0 to 1) and the P/E count of the blocks. The blocks having a data age that meets the static/dynamic data threshold 310 (e.g., blocks 304 and 306) can be considered to store static data while the blocks having a data age that does not meet the static/dynamic data threshold 310 (e.g., block 302) can be considered to store dynamic data. As described in this disclosure, the data age of the data can be determined or estimated relative to when the data was written to a memory based on instructions from a host system.

In one embodiment, the garbage collection/static wear leveling module 132 initiates a static wear leveling operation when a P/E count for a destination block like the current destination block 308 (e.g., an open cold block) is high, such as when the P/E count of the current destination block 308 exceeds the P/E window end 312. The garbage collection/static wear leveling module 132 may then select one or more source blocks having a lower P/E count than the P/E count of the current destination block 308 and relocate the data from the selected source block(s) to the current destination block 308. For example, the blocks 302 and 304 may be selected as the source blocks, and thus the data stored in the blocks 302 and 304 can be moved to the current destination block 308.

The garbage collection/static wear leveling module 132 can in addition select the source block(s) for the static wear leveling operation based at least on whether the one or more source blocks have a low P/E count and/or contain static data. As illustrated by FIG. 3, the source block(s) may be selected from the static block pick area below the P/E threshold 314 and/or from the area above the static/dynamic data threshold 310. For instance, the garbage collection/static wear leveling module 132 may select one or more source blocks that contain static data having the oldest data age from the blocks which have a P/E count below the P/E threshold 314 (e.g., block 306 may be selected). In one implementation, the garbage collection/static wear leveling module 132 selects a block for static wear leveling according to the following algorithm:

Search the static block pick area for one or more blocks;
    Find the block having a maximum data age;
    IF the data age of the block having the maximum data age meets the static/dynamic data threshold
        Pick the block having the maximum data age for wear leveling;
    ELSE
    Perform garbage collection using a different or default approach.

Advantageously, in one embodiment, selecting one or more source blocks according to whether the one or more source blocks have a low P/E count and/or contain static data may prevent unnecessary or inefficient static wear leveling by deciding if there is a sufficient benefit for performing static wear leveling using the source block(s). For example, if there may be no source block with static data among the blocks having a low P/E count (e.g., no blocks storing static data meeting the static/dynamic data threshold 310), then the garbage collection/static wear leveling module 132 may determine that there is insufficient benefit to perform static wear leveling using the blocks. This may be because those blocks are likely to be programmed or erased in the near future due to new host data writes. The P/E counts of those blocks thus may likely increase in the near future and decrease the P/E window size, thereby accomplishing a goal of static wear leveling without performing a potentially duplicative and extraneous static wear leveling operation. Therefore, in some embodiments, the garbage collection/static wear leveling module 132 performs static wear leveling when static data is found in lower P/E count blocks, and not in some instances when dynamic data is found in lower P/E count blocks.

Because static data can be written to the non-volatile memory array 140 at any time, it may take a long time until particular data is determined to be static. This can be in spite of the possibility that the data age of certain blocks in the static block area may eventually grow to pass the static/dynamic data threshold. Accordingly, at certain times, the blocks in static block pick area can appear to contain solely dynamic data, and static wear leveling may not to take place because no block may qualify to be used to move static data. The P/E count of some blocks of the non-volatile memory array 140 thus may continue to increase well beyond the P/E window end.

Figure 4:
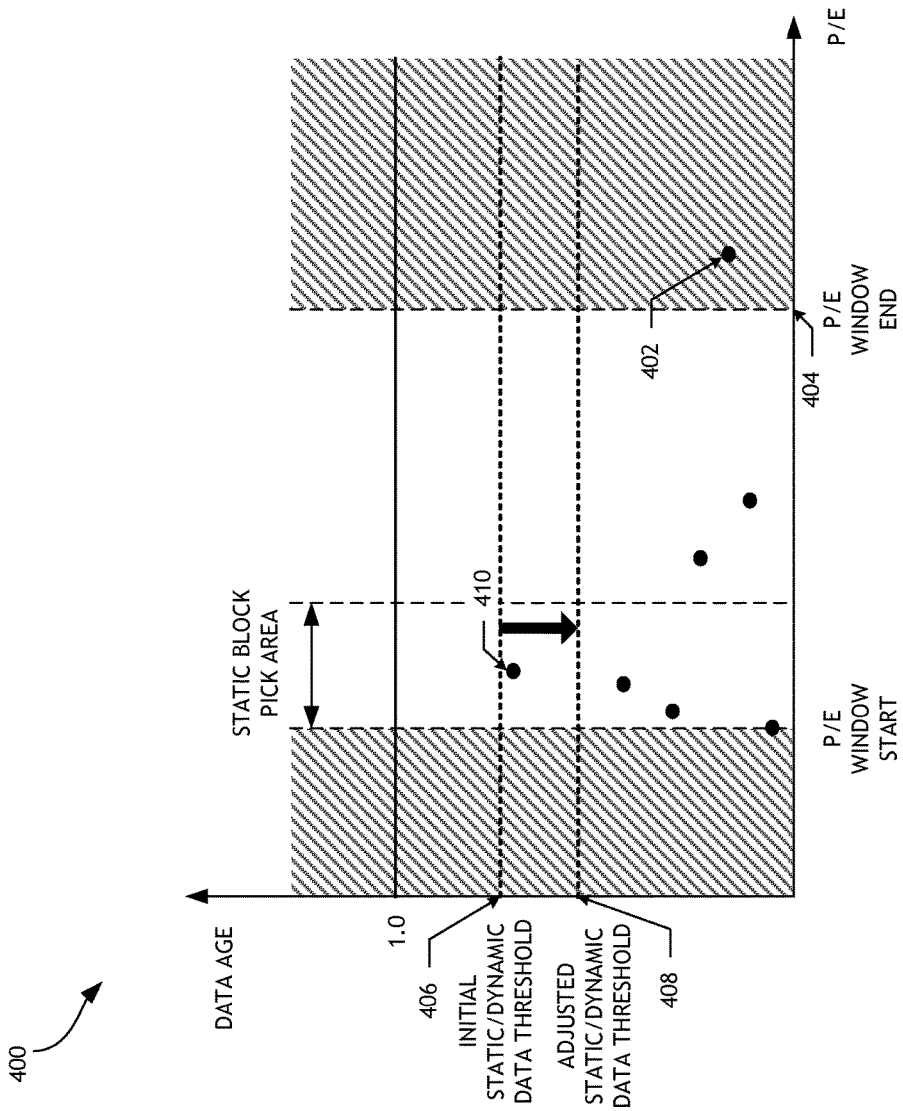
FIG. 4 is a graph that illustrates conditions for performing static wear leveling according to one embodiment of the invention.

To mitigate this condition, the P/E count of a current destination block 402 can be used as a feedback to adjust the static/dynamic data threshold as illustrated in the graph 400 of FIG. 4. For example, a comparison between the P/E count of the current destination block 402 and the P/E window end 404 can be used to lower the static/dynamic data threshold from an initial static/dynamic data threshold 406 to an adjusted static/dynamic data threshold 408. In one implementation, the data age level for the static/dynamic data threshold is determined as using Equation 6:

$$\text{Threshold} = \alpha - \beta \times \left( \frac{\text{OpenBlock } \Delta P/E - \text{Max } \Delta P/E}{\text{Max } \Delta P/E} \right) \quad \text{(Equation 6)}$$

where OpenBlock $\Delta P/E$ corresponds to a P/E count difference between the P/E count of the current destination block 402 and the P/E window start (see, e.g., FIG. 2), Max $\Delta P/E$ corresponds to a P/E count difference between the P/E count of the P/E window end and the P/E window start (see, e.g., FIG. 2), $\alpha$ corresponds to an initial static/dynamic data threshold, and $\beta$ corresponds to a factor usable to control the rate of adjustment of the static/dynamic data threshold relative to the P/E count difference between the P/E count of the current destination block 402 the P/E window end. In one implementation, the values of $\alpha$ and $\beta$ are 0.8 and 0.6, respectively, although different values may be used in other implementations. Although Equation 6 illustrates a linear decrease in the static/dynamic data threshold responsive to the P/E count of the current destination block 402, other approaches may be used, such as equations based on a logarithmic, exponential, or another function of the P/E count of the current destination block 402. Moreover, a comparison between the P/E count of the current destination block 402 and another value (e.g., the P/E window start) can be used to adjust the static/dynamic data threshold in some embodiments.

As illustrated in FIG. 4, in one embodiment, once the static/dynamic data threshold lowers to the adjusted static/dynamic data threshold 408, one or more blocks (e.g., a block 410) in the static block pick area may now be above the adjusted static/dynamic data threshold 408. Such blocks can now qualify as selectable source block(s) for a static wear leveling operation, and the degree to which the P/E count of blocks may exceed the P/E window end can accordingly be controlled or limited.

Figure 5:
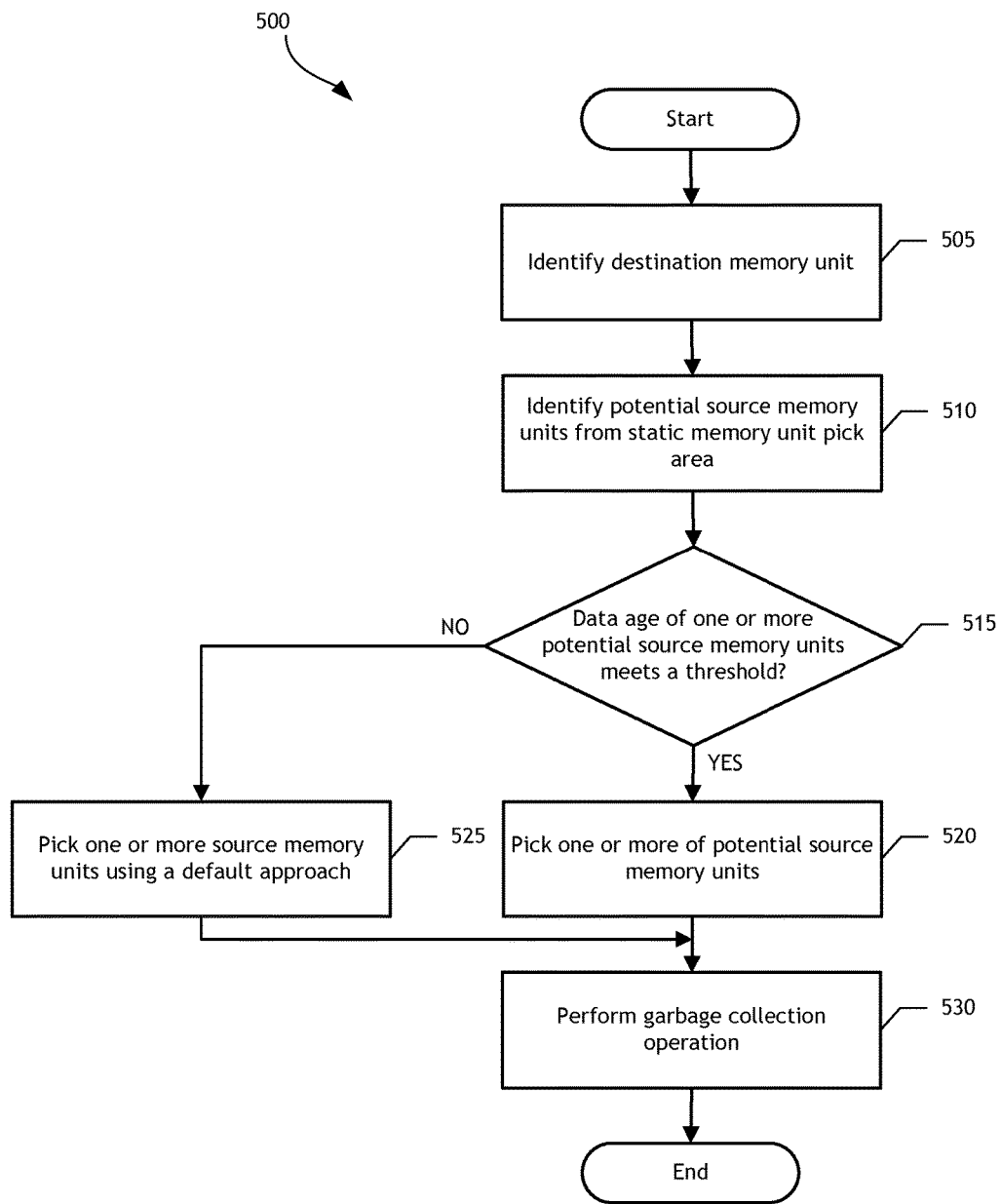
FIG. 5 is a flow diagram illustrating a process for completing a garbage collection operation according to one embodiment of the invention.

FIG. 5 is a flow diagram illustrating a process 500 for completing a garbage collection operation according to one embodiment of the invention. In some embodiments, the controller 130 and/or the garbage collection/static wear leveling module 132 are configured to perform the process 500.

At block 505, the process 500 identifies a destination memory unit. For instance, the garbage collection/static wear leveling module 132 can identify a destination block of the non-volatile memory array 140 for a garbage collection operation, such as static wear leveling. The destination block may have a relatively higher P/E count. At block 510, the process 500 identifies one or more potential source memory units from a static memory unit pick area. The static memory unit pick area can, for example, include blocks of the non-volatile memory array 140 that have a relatively lower P/E count.

At block 515, the process 500 determines whether the data age of one or more of the potential source memory units meets a threshold, such as a static/dynamic data threshold. If the data age of one or more of the potential source memory units meets the threshold, at block 520, the process 500 picks one or more of the potential source memory units meeting the threshold for the garbage collection operation. On the other hand, at block 525, if the data age of one or more of the potential source memory units does not meet the threshold, the process 500 picks one or more source memory units using a default approach. For example, the process 500 can select one or more blocks of the non-volatile memory array 140 for the garbage collection operation based on an amount of invalid data stored in the one or more blocks. At block 530, the process 500 performs the garbage collection operation using the identified destination memory unit and the one or more picked source memory units at block 520 or 525.

CONCLUSION

While certain embodiments have been described, these embodiments have been presented by way of example only, and are not intended to limit the scope of the disclosure. Indeed, the novel methods and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual steps taken in the process shown in FIG. 5 may differ from those shown in the figure. Depending on the embodiment, certain of the steps described in the example above may be removed, others may be added, and the sequence of steps may be altered and/or performed in parallel. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A data storage system comprising:
   a non-volatile solid-state memory array comprising memory units; and
   a controller configured to:
   identify a destination memory unit of the memory units, wherein a number of program-erase (P/E) operations performed on the destination memory unit exceeds a first P/E threshold,
   determine a data age threshold that is lower than an initial data age threshold, wherein the determining is based on reducing the initial data age threshold by a scaling factor, which is based on the number of P/E operations performed on the destination memory unit and on the first P/E threshold,
   select a source memory unit from a set of memory units storing data of the memory units, the source memory unit selected based at least on a data age of the data stored in the source memory unit exceeding the data age threshold separating a first data age range from a second data age range and on the number of P/E operations performed on the source memory unit not exceeding a second P/E threshold, and
   perform an internal memory operation using the destination memory unit and the source memory unit.

2. The data storage system of claim 1, wherein the internal memory operation comprises a wear leveling operation.

3. The data storage system of claim 1, wherein the second P/E threshold corresponds to the number of P/E operations performed on a memory unit that has been subjected to a lowest number of P/E operations, wherein the first P/E threshold corresponds to the sum of the second P/E threshold and a P/E window size, and wherein the scaling factor includes a numerator comprising the number of P/E operations performed on the destination memory unit subtracted by the first P/E threshold, the numerator being subtracted by the P/E window size, and a denominator comprising the P/E window size.

4. The data storage system of claim 1, wherein the controller is further configured to perform the internal memory operation using the destination memory unit and a memory unit selected based at least on the amount of invalid data stored in the memory unit when the data age of the data stored in each of the set of memory units is below the data age threshold, and wherein the internal memory operation comprises a garbage collection operation.

5. The data storage system of claim 1, wherein the controller is further configured to:
   maintain a counter indicative of a time duration that the controller is turned on; and
   determine the data age of the data stored in the memory units based at least on a comparison between a first counter value when the data age is determined and a second counter value when the data is written to the memory units.

6. The data storage system of claim 1, wherein the controller further is configured to:
   assign timestamps to the data written to the memory units indicative of when the data is written to the memory units; and
   determine the data age of the data stored in the memory units based at least on the timestamps.

7. The data storage system of claim 6, wherein the controller is further configured to:
   perform a garbage collection operation including writing the data stored in two or more memory units to a single memory unit; and
   assign a single timestamp to the data written to the single memory unit by combining the timestamps assigned to the data stored in the two or more memory units.

8. The data storage system of claim 7, wherein the controller is further configured to combine the timestamps using a weighted average.

9. The data storage system of claim 6, wherein the controller is further configured to normalize the timestamps relative to a maximum data age of the data stored in the memory units or a value proportional to a write time for filling the memory units with data.

10. The data storage system of claim 1, wherein the controller is further configured to select as the source memory unit a memory unit that stores the data having an oldest data age of the data stored in the set of memory units.

11. The data storage system of claim 1, wherein the data comprises data received from a host system.

12. In a data storage system comprising a controller and a non-volatile solid-state memory array including memory units, a method comprising:
    identifying a destination memory unit of the memory units, wherein a number of program-erase (P/E) operations performed on the destination memory unit exceeds a first P/E threshold;
    determining a data age threshold that is lower than an initial data age threshold, wherein the determining is based on reducing the initial data age threshold by a scaling factor, which is based on the number of P/E operations performed on the destination memory unit and on the first P/E threshold;
    selecting a source memory unit from a set of memory units storing data of the memory units, the source memory unit selected based at least on a data age of the data stored in the source memory unit exceeding the data age threshold separating a first data age range from a second data age range and on the number of P/E operations performed on the source memory unit not exceeding a second P/E threshold which is below the first P/E threshold; and
    performing an internal memory operation using the destination memory unit and the source memory unit.

13. The method of claim 12, wherein the internal memory operation comprises a wear leveling operation.

14. The method of claim 12, wherein the second P/E threshold corresponds to the number of P/E operations performed on a memory unit that has been subjected to a lowest number of P/E operations, wherein the first P/E threshold corresponds to the sum of the second P/E threshold and a P/E window size, and wherein the scaling factor includes a numerator comprising the number of P/E operations performed on the destination memory unit subtracted by the first P/E threshold, the numerator being subtracted by the P/E window size, and a denominator comprising the P/E window size.

15. The method of claim 12, further comprising performing the internal memory operation using the destination memory unit and a memory unit selected based at least on the amount of invalid data stored in the memory unit when the data age of the data stored in each of the set of memory units is below the data age threshold, and wherein the internal memory operation comprises a garbage collection operation.

16. The method of claim 12, further comprising:
    maintaining a counter indicative of a time duration that the controller is turned on; and
    determining the data age of the data stored in the memory units based at least on a comparison between a first counter value when the data age is determined and a second counter value when the data is written to the memory units.

17. The method of claim 12, further comprising:
    assigning timestamps to the data written to the memory units indicative of when the data is written to the memory units; and
    determining the data age of the data stored in the memory units based at least on the timestamps.

18. The method of claim 17, further comprising:
    performing a garbage collection operation including writing the data stored in two or more memory units to a single memory unit; and
    assigning a single timestamp to the data written to the single memory unit by combining the timestamps assigned to the data stored in the two or more memory units.

19. The method of claim 18, wherein said combining comprises combining the timestamps using a weighted average.

20. The method of claim 17, further comprising normalizing the timestamps relative to a maximum data age of the data stored in the memory units or a value proportional to a write time for filling the memory units with data.

21. The method of claim 12, wherein said selecting comprising selecting as the source memory unit a memory unit that stores the data having an oldest data age of the data stored in the set of memory units.

22. The method of claim 12, wherein the data comprises data received from a host system.

* * * * *